May 2, 1933.  P. A. SHAVER  1,907,250
DEVICE FOR MAKING RELIEF MAPS FROM CONTOUR MAPS
Filed May 20, 1929  2 Sheets-Sheet 2
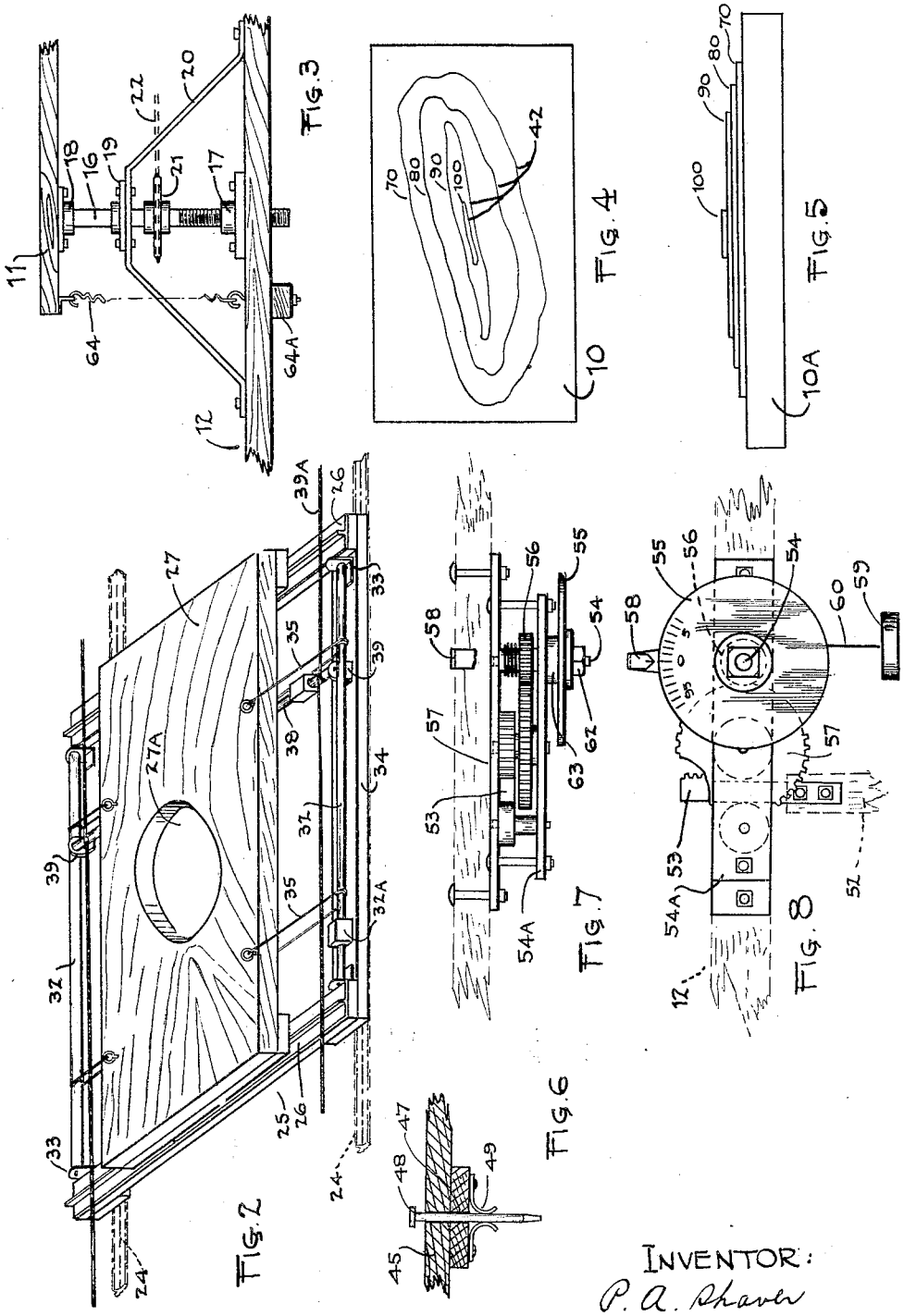

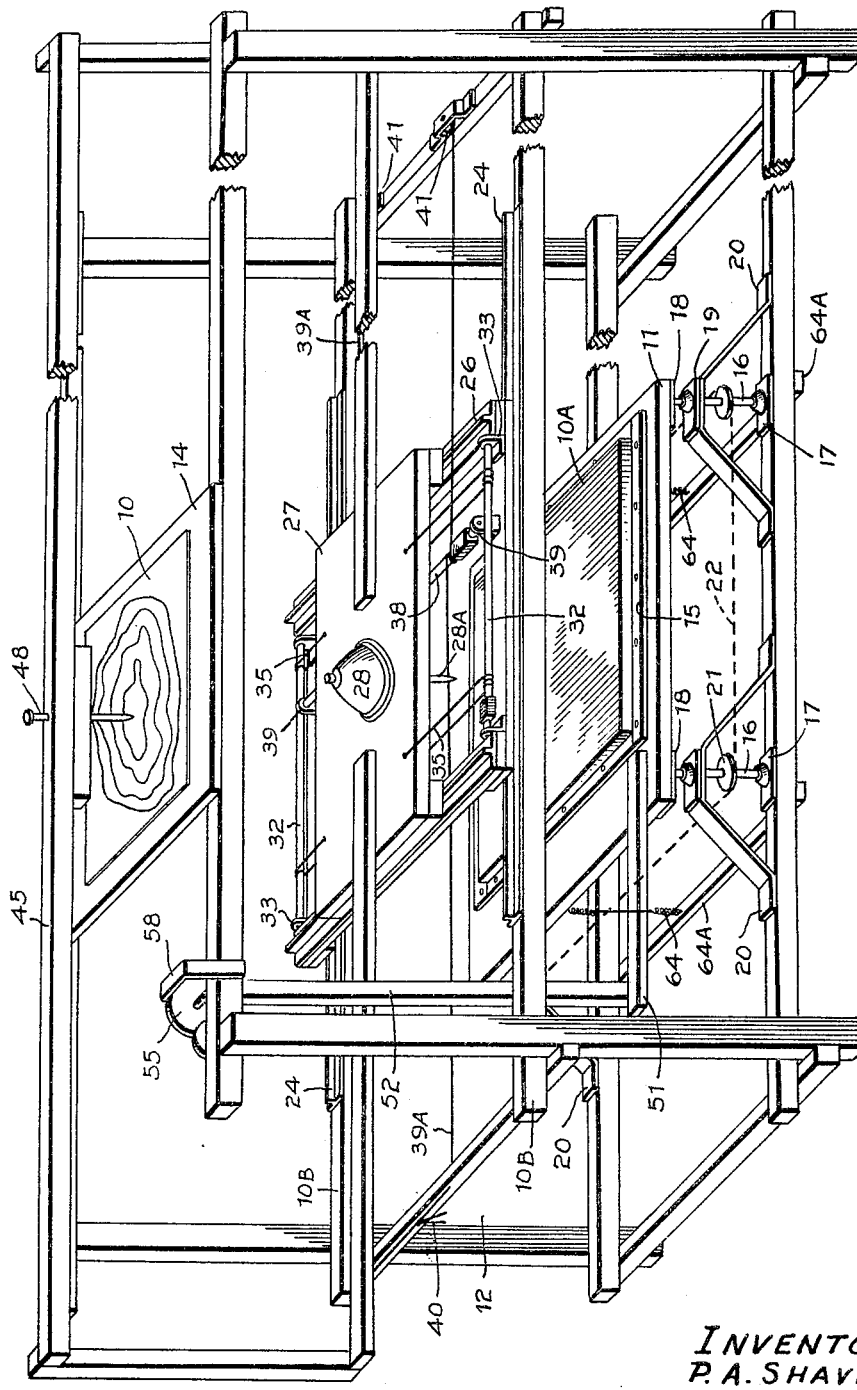

Patented May 2, 1933

1,907,250

UNITED STATES PATENT OFFICE

PETER ALBERT SHAVER, OF OTTAWA, ONTARIO, CANADA

DEVICE FOR MAKING RELIEF MAPS FROM CONTOUR MAPS

Application filed May 20, 1929. Serial No. 364,682.

This invention relates to a device for making relief models or maps from contour maps.

The primary object of my invention is to greatly expedite the making of relief models by doing mechanically what is generally done manually, thus resulting not only in appreciable economy in time and money but also making for greater accuracy, uniformity, and better work. The manual method generally if not universally used in making such models or maps, consists in building up or superposing separate layers or strata of cardboard each cut to form in plan to the area comprised within a closed contour line, each layer being in turn secured to an underlying one; once this building up process is completed, other well known steps are taken to finish the model. The cutting of these pieces of cardboard into their desired shapes represents considerable labor, is extremely trying, and requires great care and application. Once the first or master model is completed, a mold is made therefrom and then as many maps are cast as are required.

With my invented device, the usual process just described of building up relief maps with superposed layers is done away with, and the map is now formed or carved from a block by removing material along lines corresponding to the various contour lines on the contour map.

Another object is to build my device so that it will operate accurately and easily, without requiring much skill or technique on the part of the operator.

Still another object is to produce such a device at a very reasonable cost, by a most simple and inexpensive design.

Other objects will appear as the specification is read in the light of the drawings.

While the drawings and specification disclose what I believe to be the best form of the invention—which was arrived at only after a good many years of experimenting—it is to be understood that I do not limit myself to this one form, but wish to secure any other form falling within the scope of the appended claims.

In the drawings, Figure 1 is a perspective view of the present form of my device, which for purposes of economy is made substantially all of wood;

Figure 2 is a fragmentary perspective view showing the motor carriage and the carriage mounting same, and illustrating means of independently moving same;

Figure 3 is a fragmentary front elevation showing the work-supporting table and means for moving same vertically;

Figure 4 is a plan view of a contour map;

Figure 5 is a side elevation of a relief model or map made from the contour map shown in Figure 4;

Figure 6 is a view in section showing means of adjustably supporting the pointer;

Figure 7 is a plan view of the measuring or calibrating means used;

Figure 8 is a front view of Figure 7.

Like numerals of reference indicate corresponding parts in the various Figures.

Referring now to the drawings by numerals, the contour map 10 from which the relief model 10a is to be made, is laid upon and tacked onto the table 14 which is secured to a rigid framework 12. The work or plaster of Paris slab for the relief model is laid upon the table 11 and secured thereto so that it cannot shift. An easy and satisfactory method of so securing the slab, consists in placing wood strips 15 around and pressing against the slab and screwing the strips to the table.

The table 11 is preferably disposed vertically below the table 14, that is with their centres lying in a same vertical line. Obviously, both of these tables should be laid out horizontally and parallel with one another.

In order that the working tool and the work may be made vertically adjustable one relatively to the other, I mount the table 11 on four upright spindles 16 threaded at the lower portion to turn in the framework, or more particularly in screw bearings 17 secured to the framework, the upper ends of the spindles turning in thrust bearings 18 secured to the table. To retain the spindles in their intended upright position, bearings 19 may be supported on brackets 20 secured to the framework. The spindles are turned to elevate or lower the table by moving the endless sprocket chain 22 which is trained around the four sprockets 21 each fixed to a spindle, and by making the sprockets with an equal number of teeth and threading the spindles to the same pitch, the table is moved uniformly. Two springs 64, tensioned between the table 11 and cross members 64A of the framework retain the table firmly on the spindles while also tending to check the turning of the same.

On the framework and more particularly on the front and rear members 10B thereof, are tracks 24 on which rides a carriage 25 provided with tracks also, shown as 26, these tracks being preferably arranged at right angles to the tracks 24. On the tracks 26 rides a second carriage 27 mounting the motor 28 to which is fastened the working tool 28A. In effect, there is a carriage riding upon another, with their respective directions of travel at right angles to one another, so that by the combination of two lineal movements, the working tool may be made to move over the work in all directions in a horizontal plane. Obviously, the tracks are laid in a horizontal plane also and in parallel arrangement with the tables 11 and 14.

To move the carriage 27, I use the following means: two rollers 32, of equal diameter, are journalled in bearings 33 secured to the members 34 of the carriage 25 and two cords 35 tied at their ends to the carriage 27 and wound around the rollers one and one half times, the cords being well tightened. By grasping and turning the enlarged portion 32A of the roller 32, the carriage 27 moves easily forwardly or rearwardly on the tracks 26 of the carriage 25 according to the direction of rotation.

To move the carriage 25, I use substantially similar means, namely, a roller 38 journalled in bearings 39 secured to the members 34 of the carriage 25 and a cord 39A wound once around the roller and formed into a closed loop by tying the ends together, as at 40. To facilitate the tensioning of this cord, pulleys 41 engaged by the cord are journalled in one end of the framework.

In order that the tool may be made to travel along lines corresponding to the contours (shown as 42 on the map 10—see Figure 4), a pointer-carrying member 45 is rigidly secured to the carriage 27 and formed to extend over the table 14. This member may be bored vertically as at 47 to receive the pointer or tracer 48, and two resilient clips 49 are positioned to press on the pointer and frictionally retain same in different positions. By operating the rollers 32 and 38, the pointer may be made to travel along the contour lines while at the same time causing the tool to cut into the work along corresponding lines or paths.

In making relief models, the vertical scale must often be changed, the particular scale used affecting the depth to which a contour is to be cut into the slab. To effect the cutting of the contour to the particular scale determined upon, I associate with the table, means of indicating any vertical movement of the table in terms of graduations on a dial. I have shown a rigid member 51 secured to and extending from the table 11 and having an upright portion 52 to which is secured the rack 53. As the table moves up or down, the rack moves therewith to the same extent. Journalled in a metal frame 54A is a spindle 54 on which is removably secured a graduated dial 55, the spindle having a pinion 56 fixed thereon. A train of gears—indicated in its entirety by numeral 57—operatively connected between the pinion 56 and the rack, translates any vertical movement of the rack into a rotary movement of the dial. An indicator or index 58 may be secured to the framework and positioned to cooperate with the dial. A weight 59 suspended from a wire 60 anchored in and wound around the spindle 54, absorbs any possible slack motion between the rack and dial.

As it is often desired to bring any graduation on the dial in correspondence with the indicator, the dial is mounted loosely on the spindle and the spindle threaded to receive a nut 62, so that the dial can be friction-held against a collar 63 formed in the spindle.

Where desired, a second dial may be installed at the other end of the device.

I have found that a high-speed wood cutting motor is the one best adapted to my device, and a simple way of securing the motor to the table 27 consists in laying it in a circular hole 27A made through the table, so sized that the motor casing may partly project below the plane of the table, the usual adjustable threaded rings being utilized to form two members engaging the table on each side thereof.

The tool used for cutting into the slab is made from a typical ¼ inch steel drill, tapered down over the lower portion and sharpened for side cutting.

The carriages 25 and 27 are provided with roller bearings (not shown) to facilitate their operation upon their respective tracks, and in my device I use showcase rails and rollers.

*Operation*

The work or slab is placed upon the table 11 and secured thereto. The table is raised by moving the chain 22 until the tool engages the work, and the motor started. The table is then raised until the tool cuts to the depth represented by a contour, say "70" shown on map, and the pointer moved by turning the rollers 32 and 38 until it lies over some point in the contour line. The pointer is then moved until it has been taken all around the contour, that is, traced the entire contour.

Let us say that the vertical scale determined upon is 1000 feet to the inch, and the dial is graduated in 100 equal divisions, representing therefore 10 vertical feet to the division. The dial is turned on the spindle 54 until its zero registers with the index 58, and the dial fixed by turning the nut 62.

The table is next lowered until the dial has revolved one division, that is 10 vertical feet. The pointer is moved until it is over the next contour line, namely "80", and the pointer taken all around this contour, the slab thus being cut into along a line or path corresponding to this contour. The pointer is worked back and forth between the contours "70" and "80" while slowly advanced, so as to remove the plaster therebetween.

The table is again lowered a distance equivalent to a division on the dial and the pointer moved over to the contour "90", and taken all around. The pointer is again worked back and forth as already explained so as to remove the plaster between the lines "80" and "90".

The same operation is repeated until all the contours have been gone over, the slab now showing a series of steps or grades, as shown in Figure 5, for instance.

The map or model is now ready for the finishing steps, namely grading between the countour steps or grades, etc.

This device may also be found to have other useful applications even if used only for model making at the present time.

What I claim is:

1. In a device for making relief models or maps from contour maps, the combination of a framework having tracks and a table for the contour map, a carriage movable on said tracks and having tracks arranged substantially at right angles to said first-mentioned tracks, a second carriage movable on said last-mentioned tracks and mounting a working tool, means for independently moving said carriages at will, a pointer-carrying member from said last-mentioned carriage extending over said contour map table, a member upon which the work may be laid and adjustably movable vertically, and means secured to and between said work-receiving member and said framework adapted to measure the vertical movement of said work-receiving member relative to said framework, whereby the depth of cut of said tool into the work may be determined.

2. In a device for making relief models or maps from contour maps, the combination of a framework, a plurality of screws turning in said framework and rotatable simultaneously, a member supported by said screws and adapted to receive the work, tracks on said framework, a carriage movable on said tracks and having other tracks arranged at right angles to said first-mentioned tracks, a second carriage movable on said second-mentioned tracks, a motor carried by said second carriage and having a cutting tool, means carried by said first-mentioned carriage for independently moving said carriages at will, a table carried by said framework upon which a contour map may be laid, a pointer-carrying member movable with said second-mentioned carriage and extending over said table, and calibrating means for measuring the movement of said work-supporting means.

3. In a device for making relief models or maps from contour maps, the combination of a framework, a plurality of screws turning in said framework and rotatable simultaneously, a member carried by said screws and adapted to receive the work, means for carrying a working tool for engagement by the work and operating to allow said tool to be moved in two directions, a table on which a contour map may be laid, a pointer-carrying member movable with said tool, and means secured to and between said work-receiving member and said framework adapted to measure the vertical movement of said work-receiving member relative to said framework whereby the depth of cut of said tool into the work may be determined.

4. In a device for making relief models or maps from contour maps, the combination of a framework, a plurality of screws turning in said framework and rotatable simultaneously, a member carried by said screws and adapted to receive the work, tension means between said member and said framework, means for carrying a working tool for engagement by the work and operating to allow said tool to be moved in two directions, a table on which a contour map may be laid, a pointer-carrying member movable with said tool, and means secured to and between said work-receiving member and said framework adapted to measure the vertical movement of said work-receiving member relative to said framework whereby the depth of cut of said tool into the work may be determined.

5. In a device for making relief models or maps from contour maps, the combination of a framework, a carriage movable in one direction in said framework, a second carriage movable on first-mentioned carriage in a direction other than the direction in which moves said first-mentioned carriage, a working tool turning in said second carriage, means for supporting the work, means supporting said work-supporting means adapted to raise and lower the same, a pointer-carrying member movable with said second-mentioned carriage, and means secured to and between said work-supporting means and said framework adapted to measure the vertical movement of said work-supporting means relative to said framework whereby the depth of cut of said tool into the work may be determined.

6. In a device for making relief models or maps from contour maps, the combination of a framework, a carriage movable in one direction in said framework, a second carriage movable on said first-mentioned carriage in a direction other than the direction in which moves said first-mentioned carriage, means for independently moving said carriages at will, a working tool turning in said second carriage, means for supporting the work, means supporting said work-supporting means adapted to raise and lower the same, a pointer-carrying member movable with said second carriage, and means secured to and between said work-supporting means and said frame work adapted to measure the vertical movement of said work-supporting means whereby the depth of cut of said tool into the work may be determined.

7. In a device for making relief models or maps, from contour maps, the combination of a framework, a table on which a contour map may be supported, a plurality of screws turning in said framework and rotatable simultaneously, a member carried by said screws adapted to receive the work, said framework having tracks, a carriage movable on said tracks and having tracks arranged substantially at right angles to said first-mentioned tracks, a second carriage movable on said last-mentioned tracks and carrying a working tool, means for independently moving said carriages at will, a pointer-carrying member from said last-mentioned carriage extending over said contour map table, and means secured to and between said work-receiving means and said framework adapted to measure the vertical movement of said work-receiving means relative to the said framework whereby the depth of cut of said tool into the work may be determined.

Signed at Ottawa, Canada, this 9th day of April, 1929.

PETER ALBERT SHAVER.